US006866034B2

(12) United States Patent
Han et al.

(10) Patent No.: US 6,866,034 B2
(45) Date of Patent: Mar. 15, 2005

(54) COOKING APPARATUS

(75) Inventors: Dae-Sung Han, Hwasung (KR); Chul Kim, Yongin (KR); Yong-Woon Han, Kunpo (KR); Seong-Deong Jang, Suwon (KR); Kyung-Hee Hahm, Seoul (KR); Joo-Yeong Yeo, Hwasung (KR); Han-Seong Kang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/652,492

(22) Filed: Sep. 2, 2003

(65) Prior Publication Data

US 2004/0089284 A1 May 13, 2004

(30) Foreign Application Priority Data

Nov. 9, 2002 (KR) .................................. 10-2002-0069444
Feb. 6, 2003 (KR) .................................. 10-2003-0007556

(51) Int. Cl.[7] ............................................. F24C 3/08
(52) U.S. Cl. ................................. 126/41 R; 126/39 R
(58) Field of Search ........................... 126/41 R, 39 R, 126/39 J, 39 D; 99/400

(56) References Cited

U.S. PATENT DOCUMENTS

| 3,152,242 A | | 10/1964 | Mott | |
|---|---|---|---|---|
| 4,421,015 A | | 12/1983 | Masters | |
| 4,862,795 A | * | 9/1989 | Hawkins | .................... 99/446 |
| 5,176,067 A | * | 1/1993 | Higgins | ........................ 99/340 |
| 5,189,945 A | | 3/1993 | Hennick | |
| 5,287,799 A | * | 2/1994 | Pickering et al. | ............. 99/446 |
| 6,023,051 A | * | 2/2000 | Fellows | .................... 219/450.1 |

FOREIGN PATENT DOCUMENTS

| FR | 2 670 274 | 6/1992 |
|---|---|---|
| GB | 2 286 111 | 8/1995 |
| JP | 11-267032 | 10/1999 |
| KR | 2002-16089 | 3/2002 |

OTHER PUBLICATIONS

Communication including Search Report from the European Patent Office dated Feb. 24, 2004.

* cited by examiner

Primary Examiner—Alfred Basichas
(74) Attorney, Agent, or Firm—Staas & Halsey LLP (57) ABSTRACT

A cooking apparatus includes a body, a heating unit, a heat reflecting unit and a food support unit. The heating units are disposed between the food support unit and the heat reflecting unit. The heat reflecting unit includes first and second inner and outer reflecting plates to reflect heat generated by the heating unit toward the food support unit. The first and second inner and outer reflecting plates are arranged to form, roughly, a W shape so that first and second recesses are formed by the first and second inner and outer reflecting plates to collect oil. The food support unit includes a pair of water tanks seated on a top of the body while being spaced apart from each other and filled with water, and a plurality of grill pipes arranged to connect the water tanks so that the grill pipes are filled with water.

27 Claims, 4 Drawing Sheets

COOKING APPARATUS

CROSS-REFERENCE TO RELATED APPLICATIONS

This application claims the benefit of Korean Patent Application No. 2002-69444 filed on Nov. 9, 2002 and Korean Patent Application No. 2003-7556 filed on Feb. 6, 2003 in the Korean Intellectual Property Office, the disclosures of which are incorporated herein by reference.

BACKGROUND OF THE INVENTION

1. Field of the Invention

The present invention relates generally to a cooking apparatus, and more particularly to a cooking apparatus that is capable of effectively transferring heat to food to be cooked, thus improving the energy efficiency of the cooking apparatus and reducing the cooking time of the cooking apparatus.

2. Description of the Related Art

It is generally known that meat, such as beef and pork, and processed meat, such as sausage and ham, are most delicious when cooked in a grilling manner in which food is cooked by directly applying heat to the food while putting the food on a grill. Accordingly, people are fond of having meat and processed meat cooked in the grilling manner.

In general, a cooking apparatus that grills food includes a heating unit that applies heat to food and a food support unit on which the food is put and which is partially exposed to the heating unit. The cooking apparatus functions to cook the food by directly transferring heat generated by the heating unit to the food put on the food support unit.

Thus, to grill meat such as beef, pork and mutton, meat that is cut into slices, each having a size suitable to fit on the food support unit, is put on the food support unit, typically with sauce formed of various condiments being applied thereto. Accordingly, when slices of meat mixed with sauce are heated by heat transferred from the heating unit, oil contained in the slices of meat and sauce applied to the meat drops downward.

Consequently, an oil collecting unit is provided in a body of the cooking apparatus to collect heated oil and sauce that drop downward from the slices of meat. The oil collecting unit is disposed under the food support unit to collect oil and sauce, and the heating unit is disposed between the food support unit and the oil collecting unit to cook food by applying heat to the food.

However, the conventional cooking apparatus, constructed as described above, cooks food through the use of heat that is only transferred upward from the heating unit, because the heating unit is disposed just under the food support unit. Accordingly, the conventional cooking apparatus cannot effectively transfer heat to the food, Thus, the conventional cooking apparatus has low energy efficiency and requires a lengthy cooking time.

Additionally, the conventional cooking apparatus is disadvantageous in that the food support unit is maintained at a high temperature due to the heat received from the heating unit, so that portions of food in contact with the heated food support unit burn, thus deteriorating the taste of the food and doing harm to the users' health.

SUMMARY OF THE INVENTION

Accordingly, it is an aspect of the present invention to provide a cooking apparatus which allows heat generated by a heating unit to be transferred effectively to food being cooked.

It is another aspect of the present invention to provide a cooking apparatus that prevents oil and sauce that drops to a heat reflecting unit from being burned by the heat of a heating unit.

It is a further aspect of the present invention to provide a cooking apparatus that prevents portions of food in contact with a food support unit from burning.

Additional aspects and advantages of the invention are set forth in part in the description which follows and, in part, will be obvious from the description, or may be learned by practice of the invention.

The foregoing and/or other aspects of the present invention are achieved by providing a cooking apparatus that includes a body equipped with at least one heating unit, a food support unit mounted on the body to hold food to be cooked, a heat reflecting unit that reflects heat generated by the heating units toward the food support unit, and a cooling unit adapted to cool the heat reflecting unit.

In an embodiment, heating units are disposed on both sides of the body between the food support unit and the heat reflecting unit, and the heat reflecting unit includes a plurality of reflecting plates that are inclined at predetermined angles toward the heating units, respectively, so that heat radiated from the heating units is reflected to the food support unit.

In an embodiment, the heat reflecting unit includes a container having an inner space, and the cooling unit includes water filling the inner space of the heat reflecting unit so that oil dropping onto the reflecting plates from the food put on the food support unit is prevented from burning.

The heat reflecting unit may further include a bottom plate, front, rear and two side plates extending from edges of the bottom plate, the front, rear and side plates being connected to outer edges of the reflecting plates, and the inner space being formed between the reflecting plates and the bottom plate.

The front plate may be formed to have a predetermined width, and may be provided with a water inlet in a top of the front plate to feed water into the inner space.

The heat reflecting unit may be included on the front plate thereof with a grip, and the body may be provided in a front thereof with a slot so that the heat reflecting unit is inserted into, and removed from, the body by pushing and pulling of the grip through the slot, respectively.

The reflecting plates may include first inner and outer reflecting plates and second inner and outer reflecting plates to roughly form a W shape so that the first inner and outer reflecting plates form a first recess therebetween and the second inner and outer reflecting plates form a second recess therebetween.

The first inner reflecting plate and the second inner reflecting plate may be arranged to face the heating units, respectively, and may be upwardly projected at the inner ends thereof to be higher than the lower ends of the heating units.

The heat reflecting unit may comprise stainless steel.

The food support unit may include a pair of water tanks seated on a top of the body while being spaced apart from each other and filled with water and a plurality of grill pipes arranged to connect the water tanks so that the grill pipes are filled with water.

The heating units each may include a ceramic body in which an electrothermal wire is encapsulated.

Additional aspects and/or advantages of the invention are set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
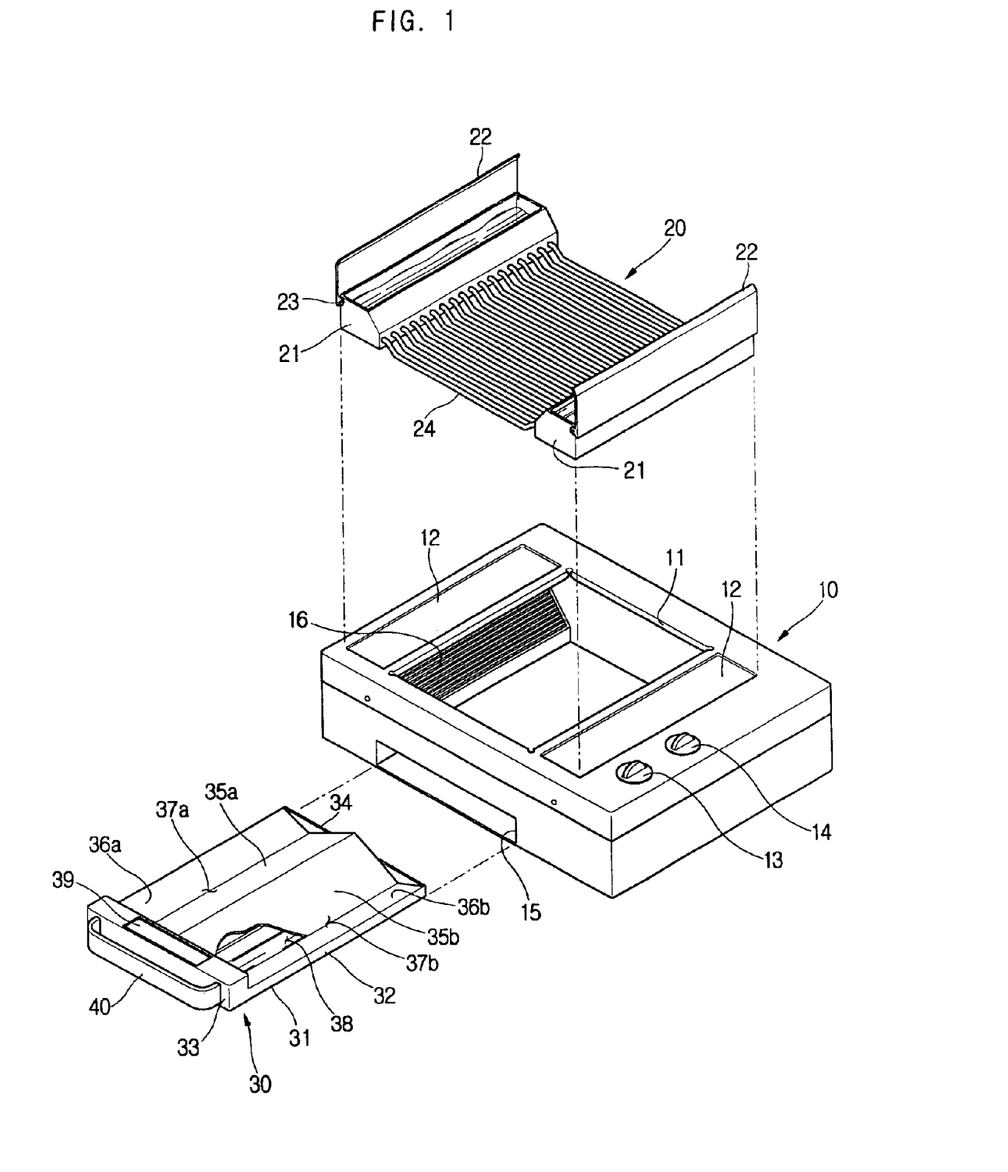
FIG. 1 is an exploded perspective view of a cooking apparatus, according to an embodiment of the present invention.
Figure 2:
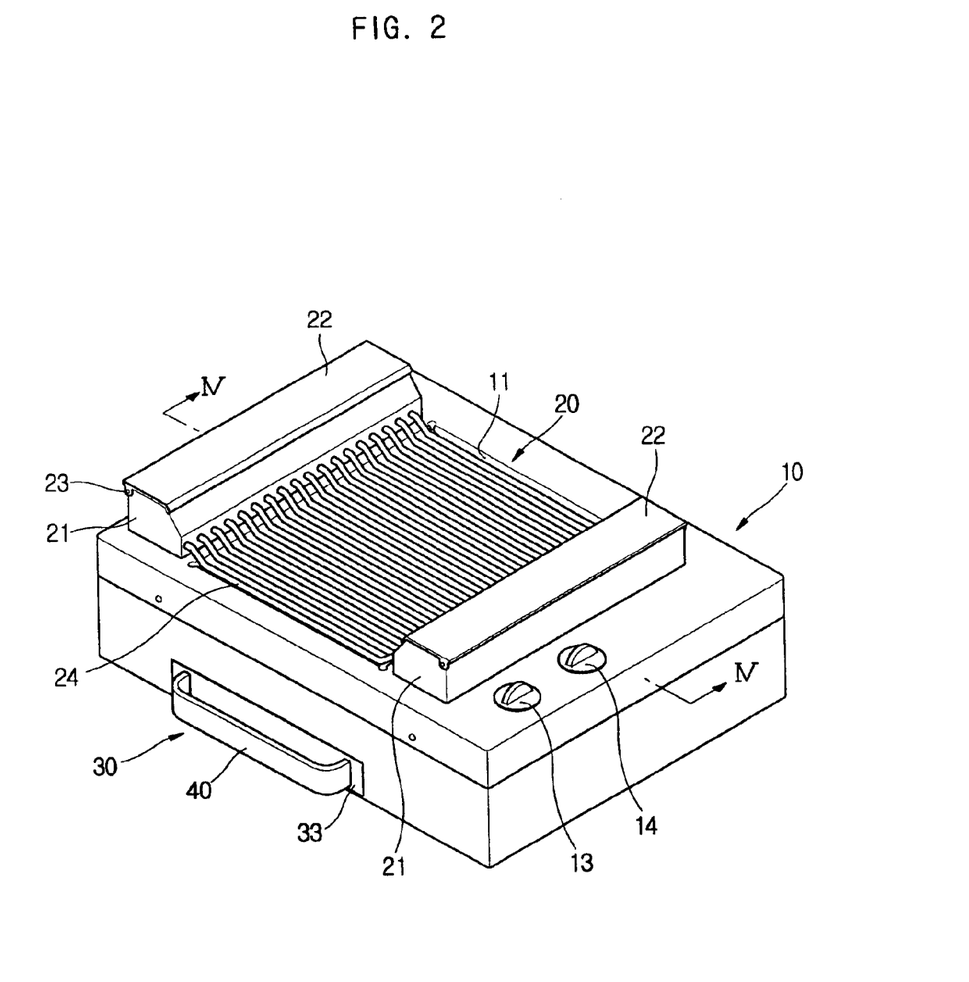
FIG. 2 is a perspective view of the cooking apparatus of an embodiment of the present invention.
Figure 3:
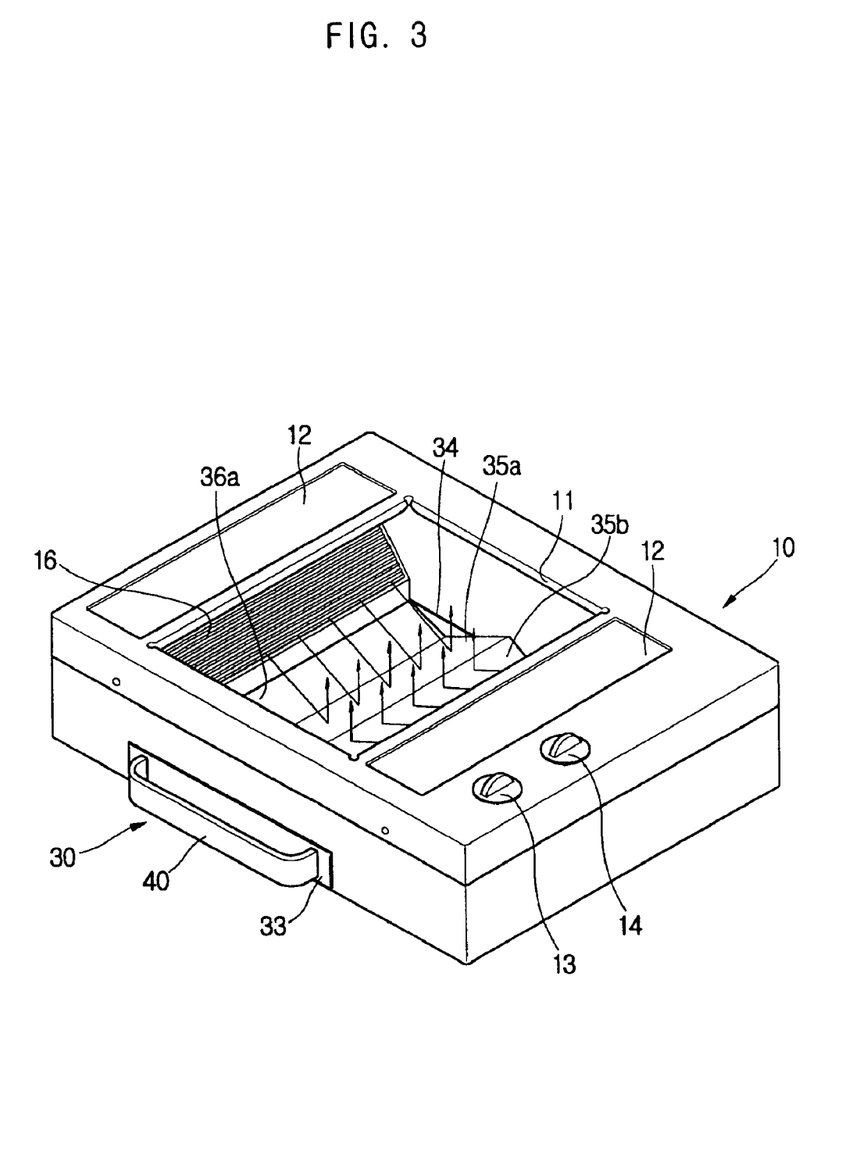
FIG. 3 is a perspective view of the cooking apparatus of FIG. 2 with a food support unit removed from a body to show an operation of a heat reflecting member.
Figure 4:
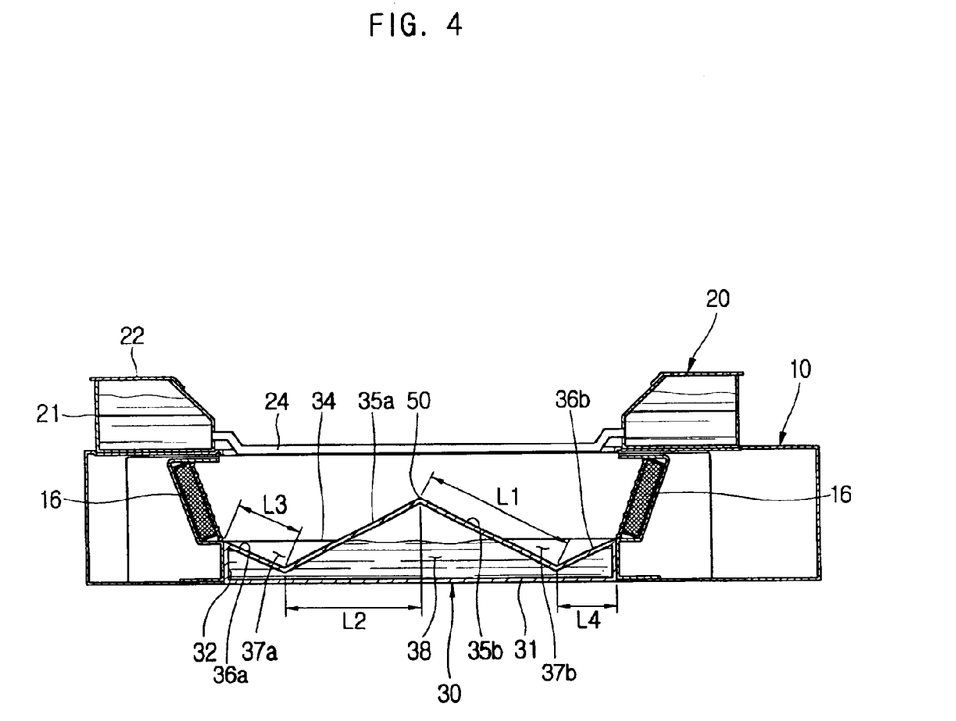
FIG. 4 is a sectional view of the cooking apparatus taken along line IV—IV of FIG. 2 to show a structure of the heat reflecting unit.

FIG. 1 is an exploded perspective view of a cooking apparatus according to an embodiment of the present invention. FIG. 2 is a perspective view of the cooking apparatus of an embodiment of the present invention. FIG. 3 is a perspective view of the cooking apparatus of FIG. 2 with a food support unit, such as a grill unit, removed from a body to show an operation of a heat reflecting member. FIG. 4 is a sectional view of the cooking apparatus taken along line IV—IV of FIG. 2 to show a structure of the heat reflecting unit.

The cooking apparatus typically includes a body 10 shaped roughly in a box form, a plurality of heating units 16 disposed in the body 10 to apply heat to food to be cooked, a food support unit 20 seated on a top of the body 10 to support food put thereon, and a heat reflecting and oil collecting unit 30 positioned in a lower portion of the body 10 to transfer radiant heat to the food support unit 20 and simultaneously receive and collect oil generated from food put on the food support unit 20. That is, the heat reflecting and oil collecting unit 30 integrates a heat reflecting structure with an oil collecting structure. Additionally, the heat reflecting and oil collecting unit 30 functions to cool a heat reflecting plate, which is described below, to prevent dropped oil from burning. Accordingly, the heat reflecting and oil collecting unit 30 may be considered as a combination of a heat reflecting unit and an oil collecting unit. Hereinafter, the heat reflecting and oil collecting unit 30 will be referred to as the "heat reflecting unit" for ease of description.

An opening 11 is provided in the top of the body 10 to allow heat generated from the heating units 16 to be transferred to the food support unit 20, and concave seat portions 12 are included in both sides of the opening 11 to allow the food support unit 20 to be seated stably thereon. A time switch 13 and a power switch 14 are included on a portion of the top of the body 10 to adjust the heating time and temperature of the heating units 16. Further, a slot 15 is formed in the lower end portion of the body 10 to allow the heat reflecting unit 30 to be inserted and removed therethrough.

The heating units 16 form a pair, and are arranged on both sides of an interior of the body 10 to be inclined toward the opening 11. The heating units 16 comprise ceramic bodies with electrothermal wires encapsulated therein to produce high-temperature far infrared rays. Alternatively, the heating units 16 may comprise gas heaters that generate heat by burning gas or charcoal heaters that generate heat by burning charcoal.

The food support unit 20 may include a pair of water tanks 21 that are spaced apart from each other to be seated on the seat portions 12, respectively, and a plurality of grill pipes 24 that are connected at both side ends thereof to the water tanks 21 to be filled with water.

A lid 22 may be mounted on an open top of each of the water tanks 21 to selectively open and close the open top of the water tank 21 through the use of a hinge 23. Accordingly, when the lid 22 is closed after the water tank 21 is filled with water while the lid 22 is opened, the grill pipes 24 are filled with water, so that the portions of food in contact with the grill pipes 24 do not burn.

The heat reflecting unit 30 typically includes a bottom plate 31 formed in a rectangular shape, two side plates 32 upwardly extending from both side edges of the bottom plate 31, front and rear plates 33 and 34 upwardly extending from front and rear edges of the bottom plate 31, first inner and outer reflecting plates 35a and 36a and second inner and outer reflecting plates 35b and 36b connected to the side, and front and rear plates 32, 33 and 34 arranged above the bottom plate 31.

The first reflecting plates 35a and 36a and the second reflecting plates 35b and 36b roughly form a W shape, and function to receive radiant heat transferred from the heating units 16 and reflect the radiant heat toward the grill pipes 24. The first inner and outer reflecting plates 35a and 36a are generally positioned in the vicinity of the left heating unit 16, and the second inner and outer reflecting plates 35b and 36b are typically positioned in the vicinity of the right heating unit 16.

More particularly, the outer ends of the first and second outer reflecting plates 36a and 36b are generally connected to the upper ends of the side plates 32, and the inner ends of the first and second outer reflecting plates 36a and 36b are typically disposed at a lower position near the bottom plate 31. Further, the outer ends of the first and second inner reflecting plates 35a and 35b are generally connected to the inner ends of the first and second outer reflecting plates 36a and 36b, and the inner ends of the first and second inner reflecting plates 35a and 35b are typically disposed at a higher position near the food support unit 20 and connected to each other at a position below a center of the food support unit 20. Accordingly, the first and second inner and outer reflecting plates 35a, 35b, 36a and 36b roughly form a W shape.

A first recess 37a may be formed by the first inner reflecting plate 35a and the first outer reflecting plate 36a so that oil dropping from food onto the first inner and outer reflecting plates 35a and 36a is collected within the first recess 37a. A second recess 37b may be formed by the second inner reflecting plate 35b and the second outer reflecting plate 36b so that oil dropping from food onto the second inner and outer reflecting plates 35b and 36b is collected within the second recess 37b.

The first and second inner and outer reflecting plates 35a, 35b, 36a and 36b are generally connected to the side plates 32 and the front and rear plates 33 and 34, so that an inner space 38 is defined by the first and second inner and outer reflecting plates 35a, 35b, 36a and 36b and the bottom plate 31.

The first and second inner reflecting plates 35a and 35b are connected to each other at inner ends thereof to be higher than the lower ends of the heating units 16 and to form a peak 50, so that heat generated by the heating units 16 is effectively reflected to the food support unit 20.

A length L1 of each of the first and second inner reflecting plates 35a and 35b is formed longer than a length L3 of each of the first and second outer reflecting plates 36a and 36b. Further, an interval L2 between the upper and lower ends of each of the first and second inner reflecting plates 35a and 35b is formed longer than an interval L4 between upper and lower ends of each of the first and second outer reflecting plates 36a and 36b. Accordingly, heat radiated from the heating units 16 is effectively reflected to the food support unit 20 by the first and second inner reflecting plates 35a and 35b. At the same time oil and sauce dropping onto the first and second inner reflecting plates 35a and 35b are collected by the first and second recesses 37a and 37b. Consequently, reflecting surfaces of the first and second inner reflecting plates 35a and 35b are sufficiently utilized.

Although in the embodiment, the heat reflecting unit has been described as including a pair of inner reflecting plates and a pair of outer reflecting plates to reflect heat generated by the heating units to the food support unit, the outer reflecting plates may be eliminated, and the lower ends of inner reflecting plates may be connected to center portions of the side plates. In this embodiment, the heat reflecting unit reflects heat generated by the heating units to the food support unit and if formed with recesses.

The front plate 33 is formed to have a certain width, and is provided with a water inlet 39 in a top of the front plate 33. When water is fed into the water inlet 39, the inner space 38 of the heat reflecting unit 30 is filled with the water. Accordingly, even though heat generated by the heating units 16 is transferred to the heat reflecting unit 30 made of material having high wear resistance, high corrosion resistance and high conductivity, such as stainless steel, oil and sauce collected within the first and second recesses 37a and 37b and adhering to the first and second inner and outer reflecting plates 35a, 35b, 36a and 36b are prevented from burning.

A grip 40 is formed on a front of the front plate 33, so that the heat reflecting unit 30 is slidably moved to be inserted into or removed from an interior of the body 10 when a user selectively pushes and pulls the heat reflecting unit 30 through the slot 15 of the body 10.

As a result, when the heat reflecting body 30 with the inner space 38 filled with water through the water inlet 39 is inserted into the interior of the body 10 through the slot 15 formed in the front of the body 10, the heat reflecting unit 30 is slidably moved to and inserted into the interior of the body 10.

Thereafter, when the water tanks 21 of the food support unit 20 are placed on the seat portions 12 provided on the top of the body 10, and water is fed to the water tanks 21 while the lids 22 of the water tanks 21 are opened, the grill pipes 24 of the food support unit 20 are positioned just above the opening 11 of the body 10 with interiors of the grill pipes 24 filled with water, and may receive heat from the heating units 16 installed in the body 10.

When the heating units 16 are operated by manipulating the time switch 13 and the power switch 14 after the heat reflecting units 30 and the food support unit 20 are attached to the body 10 and meat, such as beef or pork, or processed meat, such as sausage or ham, is put on the food support unit 20, part of the heat is directly transferred to the grill pipes 24 of the food support unit 20, and as shown in FIG. 3, the remaining heat downwardly transferred is reflected to the grill pipes 24 by the first and second inner and outer reflecting plates 35a, 35b, 36a and 36b, thus cooking the food.

In this embodiment, since the interiors of the grill pipes 24 are filled with water, portions of food in contact with the grill pipes 24 are prevented from burning and adhering to the grill pipes 24 even though heat is transferred to the grill pipes 24.

When oil is separated from the food in the process of grilling the food, the sauce formed of various condiments and applied to the food drops downward together with the oil. The oil and sauce having dropped downward, flow downward along the first and second inner and outer reflecting plates 35a, 35b, 36a and 36b, and are collected within the first and second recesses 37a and 37b. In this embodiment, since the interior of the heat reflecting unit 30 is filled with water, the oil and sauce collected within the first and second recesses 37a and 37b and adhering to the first and second inner and outer reflecting plates 35a, 35b, 36a and 36b are prevented from burning. Accordingly, the cleaning of the heat reflecting unit 30 after cooking is easily carried out.

As described above in detail, the cooking apparatus of the embodiments of the present invention directly transfers heat generated by the heating units to the food support unit on which food is put and reflects the heat to the food support unit through the use of the heat reflecting unit, so that the energy efficiency of the cooking apparatus is increased, and the cooking time of the cooking apparatus is shortened.

In addition, in the cooking apparatus of the embodiments of the present invention, the reflecting plates of the heat reflecting unit are maintained at a predetermined temperature or lower by water filling the interior of the heat reflecting unit, so that oil and sauce dropping from the food onto the reflecting plates of the heat reflecting unit are prevented from burning, and consequently, the work of cleaning the heat reflecting unit is easily performed.

In addition, the cooking apparatus of the present invention is constructed so that the interiors of the grill pipes on which food is put are filled with water. Accordingly, the portions of food in contact with the grill pipes are prevented from adhering to the grill pipes, so that the food is grilled properly, and the burning of the food is prevented.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A cooking apparatus, comprising:
    at least one heating unit mounted in a body;
    a food support unit mounted on the body to hold food to be cooked, the food support unit comprising a plurality of grill pipes filled with water to cool the grill pipes;
    a heat reflecting unit to reflect heat generated by the at least one heating unit toward the food support unit; and
    a water cooling unit to cool the heat reflecting unit using water.

2. The cooking apparatus as set forth in claim 1, wherein, where the cooking apparatus includes at least two heating units:

the at least two heating units are disposed on opposite sides of the body between the food support unit and the heat reflecting unit; and the heat reflecting unit includes a plurality of reflecting plates inclined at predetermined angles toward the at least two heating units, respectively, to reflect heat radiated from the at least two heating units to the food support unit.

3. The cooking apparatus as set forth in claim 2, wherein: the heat reflecting unit comprises a container having an inner space; and the cooling unit comprises water filling the inner space of the heat reflecting unit to prevent oil dropping from the food put on the food support unit onto the reflecting plates from burning.

4. The cooking apparatus as set forth in claim 3, wherein: the heat reflecting unit further comprises:

a bottom plate, a front plate, a rear plate and two side plates extending from edges of the bottom plate, the front plate, the rear plate and the two side plates being connected to outer edges of the reflecting plates; and the inner space is formed between the reflecting plates and the bottom plate.

5. The cooking apparatus as set forth in claim 4, wherein the front plate is formed to have a predetermined width, and includes a water inlet in a top of the front plate to feed water into the inner space.

6. The cooking apparatus as set forth in claim 5, wherein the heat reflecting unit includes a grip on the front plate thereof, and the body is located in a front thereof with a slot wherein the heat reflecting unit is inserted into and removed from the body by pushing and pulling of the grip through the slot, respectively.

7. The cooking apparatus as set forth in claim 2, wherein the reflecting plates comprise: first inner and outer reflecting plates; and second inner and outer reflecting plates, roughly forming a W shape wherein the first inner and outer reflecting plates form a first recess therebetween and the second inner and outer reflecting plates form a second recess therebetween.

8. The cooking apparatus as set forth in claim 7, wherein the first inner reflecting plate and the second inner reflecting plate are arranged to face the at least two heating units, respectively, and are upwardly projected at inner ends thereof to be higher than lower ends of the at least two heating units.

9. The cooking apparatus as set forth in claim 1, wherein the heat reflecting unit comprises stainless steel.

10. The cooking apparatus as set forth in claim 1, wherein the food support unit comprises:

a pair of water tanks seated on a top of the body while being spaced apart from each other and filled with water; and the plurality of grill pipes arranged to connect the water tanks to fill the grill pipes with water.

11. The cooking apparatus as set forth in claim 1, wherein the at least one heating unit each comprises a ceramic body in which an electrothermal wire is encapsulated.

12. A cooking apparatus, comprising:
a body having a top with an opening;
at least one heating unit arranged in the body;
a food support unit mounted on a top of the body; and
a heat reflecting unit disposed below the opening in the body and having a plurality of reflecting plates inclined toward the at least one heating unit to reflect heat from the at least one heating unit to the food support unit, wherein the heat reflecting unit further comprises a bottom plate, a front plate, a rear plate and two side plates upwardly extending from edges of the bottom plate, the reflecting plates being disposed within the front plate, the rear plate and the two side plates and comprising first and second inner and outer reflecting plates disposed near the heating units, roughly forming a W shape, and wherein the first and the second inner and outer reflecting plates, respectively, form first and second recesses therebetween, respectively, and the bottom plate, the front plate, the rear plate, the two side plates and the reflecting plates define an inner space therebetween.

13. The cooking apparatus as set forth in claim 12, wherein the heat reflecting unit is integrated with an oil collecting unit that collects oil dropping from the food support unit.

14. The cooking apparatus as set forth in claim 12, wherein the front plate is formed to have a predetermined width, and has a water inlet in a top of the front plate to feed water into the inner space.

15. The cooking apparatus as set forth in claim 12, wherein the heat reflecting unit comprises stainless steel.

16. The cooking apparatus as set forth in claim 12, wherein a first length of each of the first and second inner reflecting plates is formed longer than a second length of each of the first and second outer reflecting plates.

17. The cooking apparatus as set forth in claim 16, wherein a first interval between upper and lower ends of each of the first and second inner reflecting plates is formed longer than a second interval between upper and lower ends of each of the first and second outer reflecting plates.

18. A cooking apparatus, comprising:
a body having a top with an opening;
at least one heating unit arranged in the body;
a food support unit mounted on the top of the body, the food support unit comprising a plurality of grill pipes filled with water to cool the grill pipes; and
a reflecting plate disposed below the opening of the body and having a protrusion that is upwardly projected to be higher than lower ends of the at least one heating unit.

19. A cooking apparatus, comprising:
a body having a top with an opening;
at least one heating unit disposed in the body;
a food support unit mounted on the top of the body;
outer reflecting plates radially and downwardly inclined from lower ends of the at least one heating unit; and
inner reflecting plates radially and upwardly inclined from lower ends of the outer reflecting plates and projected at inner ends thereof to be higher than lower ends of the at least one heating unit;

wherein each of the inner reflecting plates has a length longer than that of each of the outer reflecting plates.

20. A cooking apparatus, comprising:
a body having a top with an opening;
at least one heating unit disposed in the body;
a food support unit mounted on the top of the body;
outer reflecting plates radially and downwardly inclined from lower ends of the at least one heating unit; and
inner reflecting plates radially and upwardly inclined from lower ends of the outer reflecting plates and projected at inner ends thereof to be higher than lower ends of the at least one heating unit;

wherein each of the inner reflecting plates has an interval between upper and lower ends thereof longer than an interval between upper and lower ends of each of the outer reflecting plates.

21. A cooking apparatus having a body, comprising:

a food support unit seated on an upper portion of the body, to support food to be cooked;

at least one heating unit positioned on a side of the body to heat the food on the food support unit;

a heat reflecting unit positioned at a predetermined angle with respect to the at least one heating unit to heat the food on the heating unit to reflect heat transmitted from the heating unit toward the food support unit, said heat reflecting unit containing liquid therein to prevent droppings, from food laid on the food support unit, from being burned, wherein said heat reflecting unit comprises front and rear walls and sidewalls extending upward to a predetermined height, with recesses defined by lower portions of the at least one reflecting plate and said walls of the heat reflecting unit to collect droppings from the food therein, and wherein said heat reflecting unit comprises a bottom plate which is defined by connecting lower ends of said walls of the heat reflecting unit to each other, with an interior space defined between the reflecting plates and the bottom plate.

22. The cooking apparatus as set forth in claim 21, wherein the at least one heating unit is located on at least one side of the body and is positioned between the food support unit and the heat reflecting unit, and said heat reflecting unit includes at least one reflecting plate, each said reflecting plate arranged to form a predetermined angle with the at least one heating unit, respectively, so that heat radiated from the heating unit is reflected to the food support unit.

23. The cooking apparatus as set forth in claim 21, wherein said front wall of the heat reflecting unit has a predetermined width, and a water refilling part formed on an upper surface of the front wall to supply water to the interior space of the heat reflecting unit, thus keeping a temperature of the heat reflecting unit below a boiling temperature of water.

24. The cooking apparatus as set forth in claim 23, further comprising a grip on a front surface of the front wall of the heat reflecting unit, and a reception hole on a front surface of the body to receive the heat reflecting unit therein, thus allowing the heat reflecting unit to be inserted into, or removed from, the body by pushing or pulling the grip.

25. The cooking apparatus as set forth in claim 21, wherein said food support unit comprises:

first and second tanks seated on the upper portion of the body spaced apart from each other, and containing a liquid therein; and a plurality of grilling pipes arranged between the first and second tanks to connect the first and second tanks to each other, wherein the liquid is supplied to the plurality of grilling pipes, thus keeping a temperature of the grilling pipes below a boiling temperature of the liquid.

26. The cooking apparatus as set forth in claim 25, wherein the liquid utilized in the first and second tanks is water.

27. The cooking apparatus as set forth in claim 21, wherein said at least one heating unit comprises a ceramic member in which an electrothermal wire is encapsulated.

* * * * *

UNITED STATES PATENT AND TRADEMARK OFFICE
CERTIFICATE OF CORRECTION

PATENT NO. : 6,866,034 B2
DATED : March 15, 2005
INVENTOR(S) : Dae-Sung Han et al.

It is certified that error appears in the above-identified patent and that said Letters Patent is hereby corrected as shown below:

Column 7,
Line 36, "plates" should continue on the same line with "reflecting";

Column 10,
Line 5, replace "part" with -- port --.

Signed and Sealed this

Seventeenth Day of January, 2006

JON W. DUDAS
*Director of the United States Patent and Trademark Office*